United States Patent [19]

Duchange et al.

[11] 4,444,857
[45] Apr. 24, 1984

[54] ELECTROCHEMICAL CELL INCLUDING A SOLID ELECTROLYTE MADE FROM A CATION CONDUCTIVE VITREOUS COMPOUND

[75] Inventors: Jean-Pierre Duchange, Nouaille Maupertuis; Jean-Paul Gabano, Poitiers, both of France

[73] Assignee: Societe Anonyme dite: GIPELEC, Levallois-Perret, France

[21] Appl. No.: 386,228

[22] Filed: Jun. 8, 1982

[30] Foreign Application Priority Data

Jun. 17, 1981 [FR] France .................. 81 11902
Jun. 17, 1981 [FR] France .................. 81 11903

[51] Int. Cl.³ ............................................ H01M 6/18
[52] U.S. Cl. ............................ 429/191; 429/199; 429/219; 429/220; 429/221; 429/228
[58] Field of Search ........... 429/191, 199, 220, 221, 429/228, 219

[56] References Cited

U.S. PATENT DOCUMENTS 4,258,109 3/1981 Liang et al. ................. 429/191
4,331,750 5/1982 Malagani et al. ............ 429/199 X

*Primary Examiner*—Charles F. LeFevour
*Attorney, Agent, or Firm*—Kenyon & Kenyon

[57] ABSTRACT

An electrochemical cell having a lithium based negative active material, an electrolyte in the form of a vitreous cation conductive compound having a formula: $aP_2S_5$, $bLi_2S$, $cLiX$, where X stands for chlorine, bromine or iodine, and a, b, and c are numbers chosen in such a manner that $b/(a+b)$ lies in the range 0.61 to 0.70 and $c/(a+b+c)$ is less than or equal to the maximum solubility in the vitreous phase of LiX in the compound $aP_2S_5$, $bLi_2S$, and a positive active material in the form of a compressed powder with particles of the electrolyte dispersed throughout said positive active material. The positive active material is chosen from the group constituted by: $(CH_x$; $Cu_dO(PO_4)_2$; $V_6O_{13}$; $V_2S_5$; $MoS_3$; CuS; S; CuO; $Cu_3B_2O_6$; $FeS_2$; $Pb_3O_4$; $Bi_2O_3$; PbO; $BiO(CrO_4)_2$; $AgBi(CrO_4)_2$; $I_2$; $MoO_3$; $WO_3$; $TiS_2$; $NiPS_3$; copper bismuthate; and lead bismuthate.

7 Claims, 6 Drawing Figures

ELECTROCHEMICAL CELL INCLUDING A SOLID ELECTROLYTE MADE FROM A CATION CONDUCTIVE VITREOUS COMPOUND

The present invention relates to electrochemical cells having a solid electrolyte made from a vitreous compound which conducts cations.

BACKGROUND OF THE INVENTION

Published French patent application No. 2 477 128 filed Feb. 29, 1980 describes a cation conductive vitreous compound having a formula: $aP_2S_5$, $bLi_2S$, $cLiX$, where X stands for chlorine, bromine or iodine, and a, b, and c are numbers chosen in such a manner that $b/(a+b)$ lies in the range 0.61 to 0.70 and $c/(a+b+c)$ is less than or equal to the maximum solubility in the vitreous phase of LiX in the compound $aP_2S_5$, $bLi_2S$.

The present invention relates to electrochemical cells of the above type having a lithium based negative active material and an electrolyte made of said vitreous compound.

Preferred embodiments of the invention provide cells of this type having high energy density by virtue of a suitable choice of positive active material.

SUMMARY OF THE INVENTION

The present invention provides an electrochemical cell having a lithium based negative active material, an electrolyte in the form of a vitreous cation conductive compound having a formula: $aP_2S_5$, $bLi_2S$, $cLiX$, where X stands for chlorine, bromine or iodine, and a, b, and c are numbers chosen in such a manner that $b/(a+b)$ lies in the range 0.61 to 0.70 and $c/(a+b+c)$ is less than or equal to the maximum solubility in the vitreous phase of LiX in the compound $aP_2S_5$, $bLi_2S$, and a positive active material in the form of a compressed powder with particles of the electrolyte dispersed throughout said positive active material.

Advantageously said positive active material comprises at least one of the following materials: $(CF)_x$; $Cu_4O(PO_4)_2$; $V_6O_{13}$; $V_2S_5$; $MoS_3$; $CuS$; $S$; $CuO$; $Cu_3B_2O_6$; $FeS_2$; $Pb_3O_4$; $Bi_2O_3$; $PbO$; $BiO(CrO_4)_2$; $AgBi(CrO_4)_2$; $I_2$; $MoO_3$; $WO_3$; $TiS_2$; $NiPS_3$; and copper or lead bismuthate.

The positive active material preferably includes between 20% and 80% by volume of solid electrolyte.

Above 80%, the positive active material becomes too dilute, while below 20% it becomes difficult to ensure proper ionic paths at relatively high currents.

The positive active material may also include particles of an electron conductor, eg. graphite, dispersed therein in order to improve operation during discharge.

When the positive active material is made from vitrifiable materials, silica particles may be included therein to enable vitrification thereof.

This is particularly applicable to lead oxides such as described in published French patent application No. 2 449 339, and also to copper or lead bismuthate.

All the compounds mentioned above for making the positive active material reduce at a potential of 2.8V or less relative to lithium. This is a necessary condition, since practical measurements of the decomposition potential of the vitreous compounds described above have shown that their range of electroactivity appears to be linked to that of lithium iodide, which gives rise to a theoretical decomposition potential of about 2.8 volts.

Further, it has been observed on these compounds that the conductivity obtained with solid glass can be approached by recompressing the powdered material: at 25° C., conductivities of about $2 \times 10^{-4} \Omega^{-1} cm^{-1}$ have been measured.

The following table shows the capacity in $Ah/cm^3$ and the initial potential in volts relative to lithium of each of the materials suitable for constituting the positive active material.

| Cathode material | Specific capacity $Ah/cm^3$ | Initial potential volts relative to Li |
|---|---|---|
| $(CF)_x$ | 1.04 | 2.7–2.8 |
| $Cu_4O(PO_4)_2$ | 2.05 | 2.6–2.7 |
| $V_6O_{13}$ | 0.88 | 2.6–2.8 |
| $V_2S_5$ | 1.50 | 2.6–2.8 |
| $MoS_3$ | 1.9–2.0 | 2.0–2.2 |
| $CuS$ | 2.4 | 2.2 |
| $S$ | 3.48 | 2.2 |
| $CuO$ | 4.31 | 2 |
| $Cu_3B_2O_6$ | 2.34 | 2 |
| $FeS_2$ | 4.46 | 1.8 |
| $Pb_3O_4$ | 2.84 | 1.5–1.6 |
| $Bi_2O_3$ | 2.95 | 1.6–1.7 |
| $PbO$ | 2.28 | 1.4–1.5 |
| $BiO(CrO_4)_2$ | 0.7 | 2.7–2.8 |
| $AgBi(CrO_4)_2$ | 1.2 | 2.8 |
| $MoO_3$ | 1 | 2.6–2.8 |
| $TiS_2$ | 0.77 | 2.5–2.6 |
| $NiPS_3$ | 1.3 | 2 |
| $CuBi_2O_4$ | 3.54 | 1.8 |
| $Bi_2Pb_2O_5$ | 2.65 | 1.5–1.6 |

These various cathode materials may be divided into two categories as follows:

(1) materials giving rise to a topochemical reduction reaction in which lithium $Li^+$ ions find their way into the structure where they are then regenerated by chemical or electrochemical reduction, for example:

$$V_6O_{13} + 3.9Li^+ + 3.9e \rightleftharpoons V_6O_{13}Li_{3.9}$$
$$\text{or } TiS_2 + Li^+ + e \rightleftharpoons TiS_2Li$$

(2) materials giving rise to a non-topochemical reduction reaction, in which the various materials used are formed in the metallic state which is generally not regenerated by a reverse reaction, but which is likely to give considerably higher specific capacities than the preceding category, for example:

$$Cu_4O(PO_4)_2 + 8Li^+ + 8e \rightarrow 4Cu + Li_8O(PO_4)_2 \text{ or}$$
$$+ Li_2O + 2Li_3PO_4$$
$$\text{or } CuBi_2O_4 + 8Li^+ \rightarrow Cu + 2Bi + 4Li_2O$$

Such materials are well adapted to the manufacture of high energy density primary cells.

The preferred electrolyte for cells in accordance with the invention has the following formula:

$0.18P_2S_5$, $0.37Li_2S$, $0.45LiI$

In practice, cells in accordance with the invention may be constituted by a pile of compressed solid electrolyte pellets, each suitably sandwiched between a pellet of lithium and a cathode.

Further, one of the main problems associated with the use of a solid electrolyte, other than the choice of an electrolyte suitable for acting as a separator between the electrodes, is the continuing ionic transport of the $Li^+$ species inside the cathode which is essential for ensuring complete reduction of the cathode active mass.

Including particles of solid electrolyte in the cathode compartment helps to solve this problem.

BRIEF DESCRIPTION OF THE DRAWINGS

Electrochemical cells having lithium-based negative active material and positive active material based on $Cu_4O(PO_4)_2$ or $FeS_2$ or $Bi_2O_4Cu$ are described by way of example with reference to the accompanying drawings, in which.

MORE DETAILED DESCRIPTION

The electrolyte used is that disclosed in said French patent application No. 2 477 128. It comprises a cation conductive vitreous compound having a formula: $aP_2S_5$, $bLi_2S$, $cLiX$, where X stands for chlorine, bromine or iodine, and a, b, and c are numbers chosen in such a manner that $b/(a+b)$ lies in the range 0.61 to 0.70 and $c/(a+b+c)$ is less than or equal to the maximum solubility in the vitreous phase of LiX in the compound $aP_2S_5$, $bLi_2S$.

More particularly, the electrolyte has the specific formula: 0.18 $P_2S_5$, 0.37 $Li_2S$, 0.45 LiI whose conductivity at ambient temperature and when in the form of a compacted powder is about $2 \times 10^{-4} \Omega^{-1} cm^{-1}$.

In a first implementation of the invention, a cathode pellet was made from a mixture having the following proportions by weight:

| | |
|---|---|
| $Cu_4O(PO_4)_2$ | 45% |
| Solid electrolyte | 50% |
| Graphite | 5% |

Figure 1:
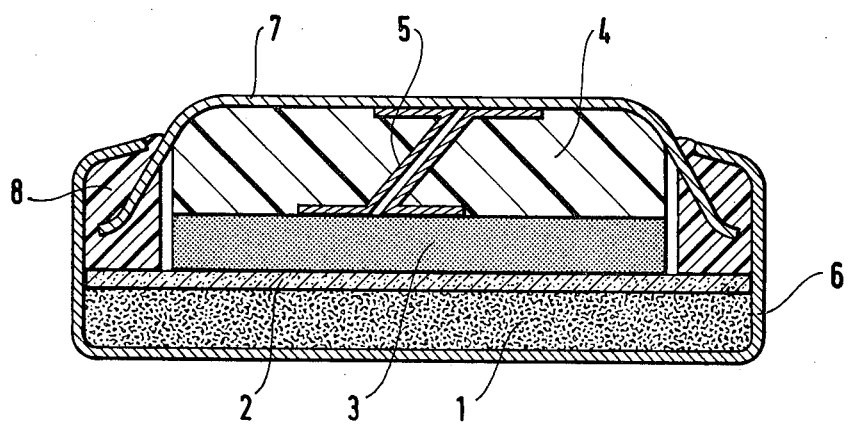
FIG. 1 is a diagrammatic section through a cell embodying the invention.

In FIG. 1, a stainless steel cathode case 6 houses a cathode pellet 1 made of the above-mentioned mixture. An electrolyte pellet 2 rests on the cathode pellet 1.

The cathode and electrolyte pellet assembly was prepared as follows:

The cathode pellet was formed in a steel die at a pressure of about 750 kg/cm². Solid electrolyte powder was then spread over the cathode layer and both layers were compressed under 3000 kg/cm².

The combined cathode/electrolyte pellet was then inserted into the cathode case 6 and a lithium disk 3 placed in contact with the electrolyte. A stainless steel cap 7 including an elastomer type spring 4 was fitted over the lithium disk. The spring serves to apply isostatic pressure on the stack of electrochemical components in order to keep the various interfaces in contact with one another as the lithium is consumed during cell discharge. Electrical connection with the anode cap was provided by two deformable staples 5 which pass through the elastomer spring 4 and which follow its deformation. A seal 8 was placed between the cathode case 6 and the anode cap 7. The entire assembly was then crimped tightly together to apply sufficient pressure to the cathode/electrolyte/anode stack to ensure proper functioning of the cell.

The various dimensions of the components of the cell shown in FIG. 1 were as follows:

Lithium anode:
  diameter = 8 mm
  thickness = 0.5 mm
Solid electrolyte:
  diameter = 10.8 mm
  thickness = 0.4 mm
Cathode:
  diameter = 10.8 mm
  thickness = 0.4 mm.

The active surface area (determined by the area of the lithium disk) = 0.5 cm²

Cell capacity (limited by the capacity of the cathode) was about = 25 mAh.

Figure 2:
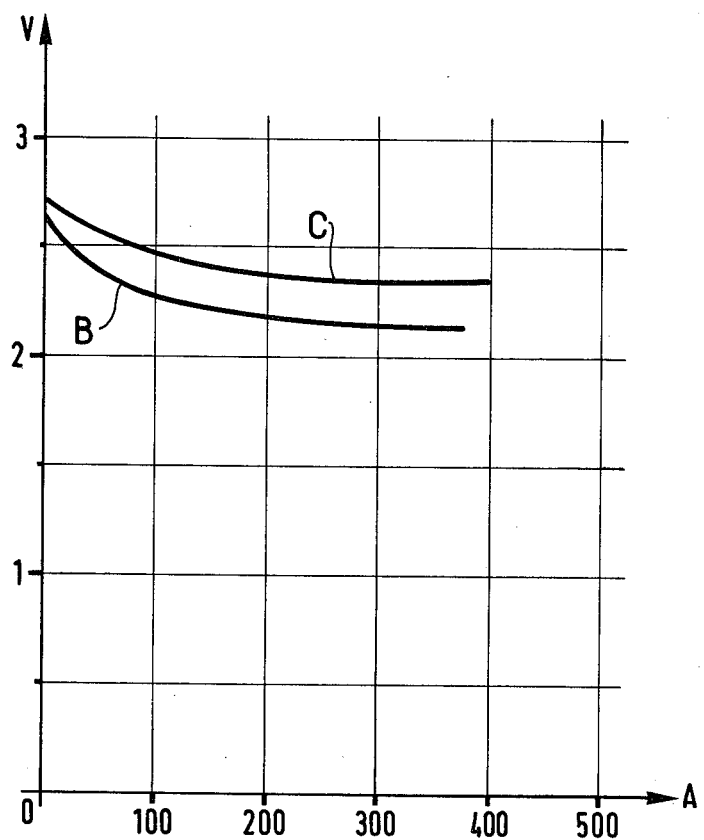
FIG. 2 is a graph showing polarisation curves at different temperatures for a cell whose positive active material is $Cu_4O(PO_4)_2$.

FIG. 2 shows the polarisation curves of the cell described above, both at 25° C. and at 70° C. The cell potential V in volts is plotted along the Y-axis as a function of current density A in $\mu A/cm^2$ plotted along the X-axis.

Curve B is the curve obtained at 25° C., while curve C is the curve obtained at 70° C.

Open circuit potential is about 2.72 V. The current/potential curves of the unit thus tested show that the system works well up to current densities of 400 $\mu A/cm^2$ without excessive polarisation. These curves were obtained from nondischarged units and are thus representative of the system's specific initial characteristics.

The discharge characteristics of these units were also measured.

Figure 3:
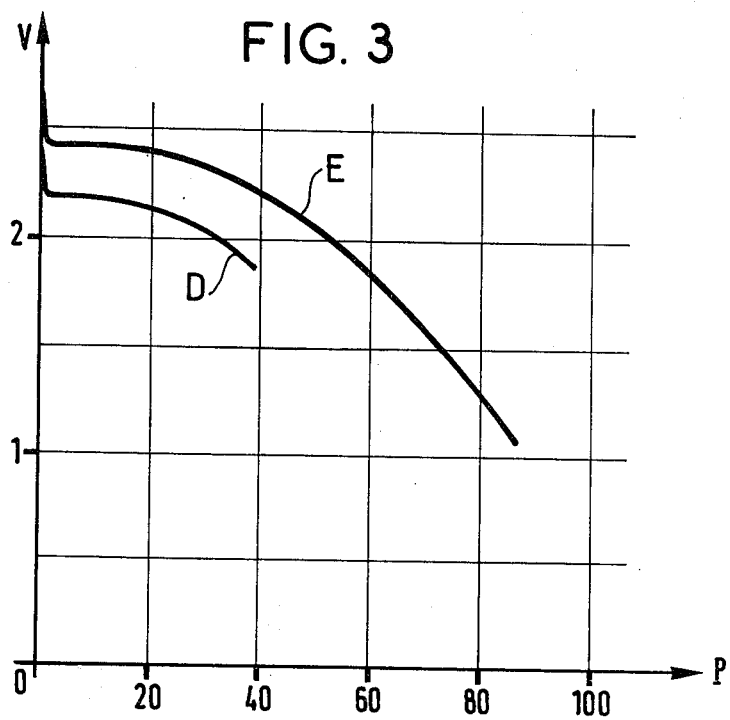
FIG. 3 is a graph showing discharge curves at different temperatures for the FIG. 2 cell.

FIG. 3 is a graph showing the discharge curves obtained for the above-described cell at 25° C. (curve D) and at 70° C. (curve E). The cell potential in volts is plotted along the Y-axis as a function of depth of discharge P in % plotted along the Y-axis. For both of these curves the current drawn was I = 100 $\mu A$ (giving a current density of 200 $\mu A/cm^2$).

These curves demonstrate the remarkable properties of copper oxyphosphate both in terms of specific capacity and in terms of discharge kinetics.

The short circuit current of $Li/Cu_4O(PO_4)_2$ cells was about 8 mA, or 16 mA/cm² given the active area of the electrodes, which shows that such a couple is also very promising for use with pulsed loads.

In a second implementation of the invention, the cathode pellet of the first implementation was replaced by a pellet obtained from a mixture of $FeS_2$, solid electrolyte and graphite in the following proportions by weight:

| | |
|---|---|
| $FeS_2$ | 51% |
| Solid electrolyte | 40% |
| Graphite | 9% |

The other features of construction (diameter, thickness, pressures used during compression, etc.) were unchanged.

The capacity of the cell was limited by its anode capacity to about 50 mAh, with the cathode having a capacity of about 75 mAh because of the high capacity per unit volume of $FeS_2$, which is about 4.4 Ah/cm³.

Figure 4:
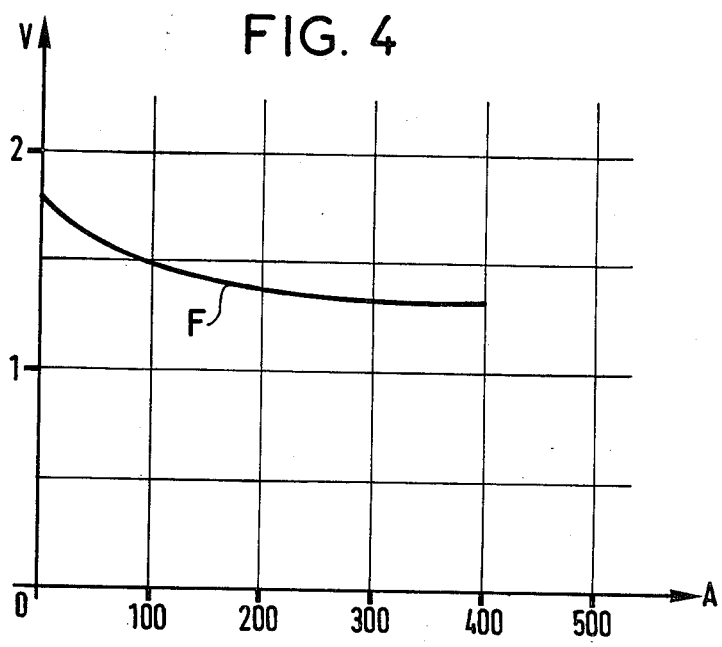
FIG. 4 is a graph showing the polarisation curve for a cell whose positive active material is $FeS_2$.

FIG. 4 shows the depolarisation curve (F) obtained for the $Li/FeS_2$ cell.

In a third implementation, the cathode pellet was made from a mixture comprising the following proportions by weight:

| | |
|---|---|
| $Bi_2O_4Cu$, 0.7 $SiO_2$ | 68% |
| Solid electrolyte | 25% |
| Graphite | 7% |

The other features of construction (diameter, thickness, pressures used during compression, etc.) were unchanged.

The cell capacity was limited by the anode to about 50 mAh, while the cathode capacity was about 60 mAh.

Figure 5:
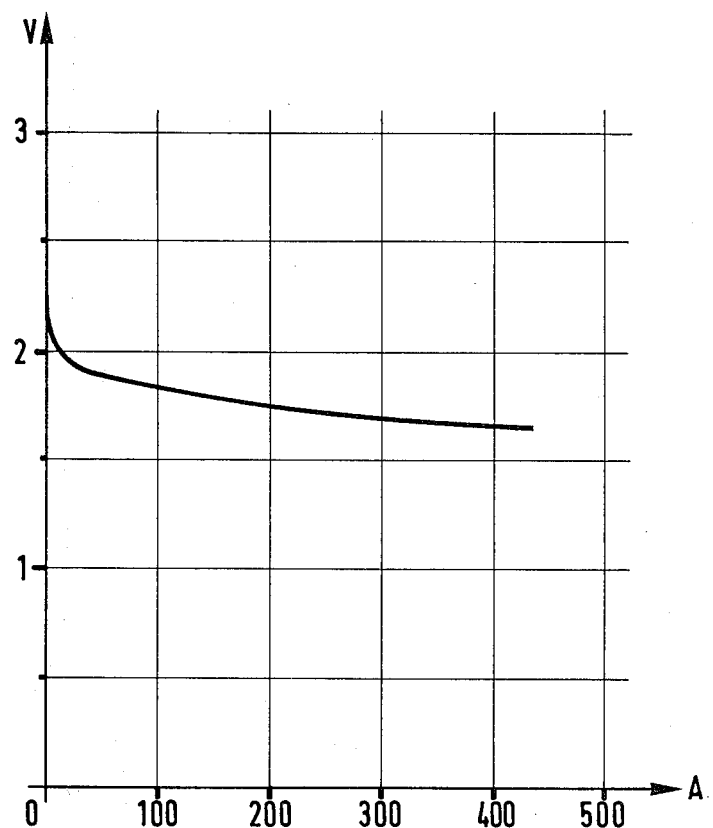
FIG. 5 is a graph showing the polarisation curve for a cell whose positive active material is $Bi_2O_4Cu$.

FIG. 5 shows the polarisation curve obtained for said cell. The cell potential in volts is plotted along the Y-axis as a function of current density A in $\mu A/cm^2$ plotted along the X-axis.

Discharge characteristics were also measured, and in particular various tests were performed on the couple $Li/TiS_2$, in which case the cell capacity is limited by the cathode, and using the same dimensions as before this capacity is 9 mAh.

Figure 6:
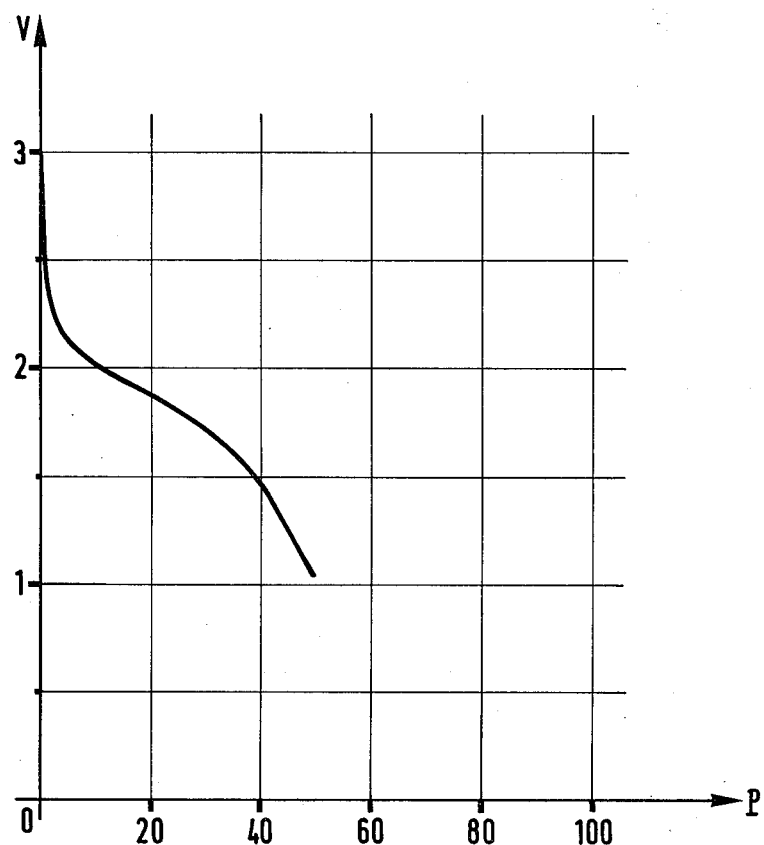
FIG. 6 is a graph showing the discharge curve at 25° C. of a cell in accordance with the invention using a $Li/TiS_2$ couple.

FIG. 6 shows the discharge curve at 25° C. for the couple $Li/TiS_2$. Unit potential in volts is plotted along the Y-axis as a function of depth of discharge in % plotted along the X-axis. The current was I=15 $\mu A$ (ie. 30 $\mu A/cm^2$).

In accordance with the invention, the positive active material may comprise a mixture of a plurality of the materials in the list claimed, with the proportions being advantageously chosen to achieve certain specific effects: for example, to create a step in the discharge curve, to obtain some specified shape of discharge curve, to obtain an end of discharge warning signal, etc ...

Thus $V_6O_{13}$ may be incorporated in $Cu_4O(PO_4)_2$ to give the resulting mixture semi-rechargeable characteristics as are required in some applications.

Such a mixture enables a compromise to be made between reversible active materials made of insertion type compounds that are usually of rather low capacity per unit volume, and non-reversible but high capacity per unit volume active materials of the above-mentioned type. The proportions chosen depend on the optimisation sought.

Finally, it is also possible for the lithium in cells in accordance with the invention to be replaced by some alloys of lithium, in particular Li-Al.

We claim:

1. An electrochemical cell having a lithium based negative active material, an electrolyte in the form of a vitreous cation conductive compound having a formula: $aP_2S_5$, $bLi_2S$, $cLiX$, where X stands for chlorine, bromine or iodine, and a, b, and c are numbers chosen in such a manner that $b/(a+b)$ lies in the range 0.61 to 0.70 and $c/(a+b+C)$ is less than or equal to the maximum solubility in the vitreous phase of LiX in the compound $aP_2S_5$, $bLi_2S$, and a positive active material, wherein the improvement comprises:

said positive active material is in the form of a compressed powder with particles of the electrolyte dispersed throughout said positive active material.

2. A cell according to claim 1, wherein the positive active material is chosen from the group consisting of: $(CF)_x$; $Cu_4O(PO_4)_2$; $V_6O_{13}$; $V_2S_5$; $MoS_3$; $CuS$; $S$; $CuO$; $Cu_3B_2O_6$; $FeS_2$; $Pb_3O_4$; $Bi_2O_3$; $PbO$; $BiO(CrO_4)_2$; $AgBi(CrO_4)_2$; $I_2$; $MoO_3$; $WO_3$; $TiS_2$; $NiPS_3$; copper bismuthate; and lead bismuthate.

3. A cell according to claim 1, wherein the positive active material includes between 20% and 80% by volume solid electrolyte.

4. A cell according to claim 1, wherein the positive active material contains particles of an electron conductor dispersed therein.

5. A cell according to claim 1, wherein the positive active material is chosen from the group consisting of lead oxides, copper bismuthate, and lead bismuthate, and wherein the active material contains particles of silica.

6. A cell according to claim 5, wherein the positive active material comprises a mixture of the following items in powder form, the percentages being by weight:

| | |
|---|---|
| $Bi_2O_4Cu$, 0.7 $SiO_2$ | 68% |
| Solid electrolyte | 25% |
| Graphite | 7% |

7. A cell according to claim 1, wherein the electrolyte has the following formula:

0.18$P_2S_5$, 0.37$Li_2S$, 0.45LiI.

* * * * *

UNITED STATES PATENT AND TRADEMARK OFFICE
CERTIFICATE OF CORRECTION

PATENT NO. : 4,444,857
DATED : 24 April 1984
INVENTOR(S) : Jean-Pierre DUCHANGE et al.

It is certified that error appears in the above—identified patent and that said Letters Patent is hereby corrected as shown below:

ABSTRACT, line 13: change "$CH_x$; $Cu_dO(PO_4)_2$" to

-- $(CF)_x$; $Cu_4O(PO_4)_2$ --.

Signed and Sealed this

Ninth Day of October 1984

[SEAL]

Attest:

Attesting Officer

GERALD J. MOSSINGHOFF

Commissioner of Patents and Trademarks